(12) United States Patent
Lindner et al.

(10) Patent No.: US 8,642,684 B2
(45) Date of Patent: Feb. 4, 2014

(54) ETHYLENE POLYMER HAVING IMPROVED RESISTANCE AGAINST THERMOOXIDATIVE DEGRADATION IN THE PRESENCE OF LIQUID FUELS COMPRISING BIODIESEL AND OXYGEN AND PLASTIC FUEL TANK MADE OF IT

(75) Inventors: Thomas Lindner, Groβ-Zimmern (DE); Harald Schmitz, Weinheim (DE)

(73) Assignee: Basell Polyolefine GmbH, Wesseling (DE)

( * ) Notice: Subject to any disclaimer, the term of this patent is extended or adjusted under 35 U.S.C. 154(b) by 311 days.

(21) Appl. No.: 12/737,513

(22) PCT Filed: Jul. 15, 2009

(86) PCT No.: PCT/EP2009/005133
§ 371 (c)(1),
(2), (4) Date: Mar. 10, 2011

(87) PCT Pub. No.: WO2010/009834
PCT Pub. Date: Jan. 28, 2010

(65) Prior Publication Data
US 2011/0160361 A1    Jun. 30, 2011

Related U.S. Application Data

(60) Provisional application No. 61/197,115, filed on Oct. 23, 2008.

(30) Foreign Application Priority Data

Jul. 22, 2008 (EP) .................................... 08013150

(51) Int. Cl.
*C08K 5/3435* (2006.01)
*C08K 5/3492* (2006.01)

(52) U.S. Cl.
USPC ............ 524/86; 524/102; 524/106; 524/236; 524/99; 524/100

(58) Field of Classification Search
USPC ...................... 524/86, 99, 100, 102, 106, 236
See application file for complete search history.

(56) References Cited

U.S. PATENT DOCUMENTS

| 2002/0077394 A1 | 6/2002 | Gugumus et al. |
| 2006/0124904 A1 | 6/2006 | Gugumus |
| 2010/0040809 A1 | 2/2010 | Müller et al. |

FOREIGN PATENT DOCUMENTS

| DE | 19756276 | 6/1999 | | |
| EP | 1042399 | 10/2000 | | |
| GB | 2 367 298 A | * | 4/2002 | ............... C08K 5/00 |
| GB | 2367298 | | 4/2002 | |
| WO | 02102896 | 12/2002 | | |

\* cited by examiner

*Primary Examiner* — Robert D. Harlan

(57) ABSTRACT

An ethylene homo- or copolymer composition is stabilized by suitable stabilizers conferring improved resistance against thermo-oxidative degradation, which occurs in the presence of liquid fuels comprising biodiesel, such as vegetable oil esters, in combination with oxygen. The stabilizers comprise a combination of at least two sterically hindered amine compounds or N-hydroxy- or N-oxylderivatives thereof in an amount of from 100 to 10 000 ppm. Such ethylene homo- or copolymer composition is highly suitable for articles of plastic and components for the transport and storage of liquid fuels comprising biodiesel, such as vegetable oil esters, preferably for plastic fuel tanks for automotive vehicles.

20 Claims, No Drawings

ETHYLENE POLYMER HAVING IMPROVED RESISTANCE AGAINST THERMOOXIDATIVE DEGRADATION IN THE PRESENCE OF LIQUID FUELS COMPRISING BIODIESEL AND OXYGEN AND PLASTIC FUEL TANK MADE OF IT

This application is the U.S. national phase of International Application PCT/EP2009/005133, filed Jul. 15, 2009, claiming priority to European Application 08013150.1 filed Jul. 22, 2008 and the benefit under 35 U.S.C. 119(e) of U.S. Provisional Application No. 61/197,115, filed Oct. 23, 2008; the disclosures of International Application PCT/EP2009/005133, European Application 08013150.1 and U.S. Provisional Application No. 61/197,115, each as filed, are incorporated herein by reference.

The present invention relates to an ethylene homo- or copolymer composition stabilized by suitable stabilizers conferring improved resistance against thermo-oxidative degradation occurring in the presence of liquid fuels comprising biodiesel in combination with oxygen, expressed as a high OIT-value (=Oxidative Induction Time).

The invention also relates to articles of plastic and components for the transport and storage of liquid fuels comprising biodiesel such as plastic fuel tanks for automotive vehicles, which are produced using such ethylene homo- or copolymer compositions stabilized by adding suitable stabilizers according to the present invention.

In automotive fuel systems an increasing use of plastic fuel tanks (PFTs) of polyethylene for spark-ignition and diesel-engined vehicles is observed. For diesel-operated vehicles in particular the so called biodiesel fuels based on renewable raw materials are increasing in importance. The principal biodiesel fuels are based on vegetable oil methyl esters (VMEs), of which rapeseed oil methyl ester (RME) is the major representative. As the biodiesel fuels become more and more important, so will their storage and transport in containers or pipes made of polyethylene.

RME proves to be aggressive to many of the plastics used in the fuel system of a motor vehicle. Even high molecular mass polyethylene, as is used to produce PFTs and other hollow articles, may be attacked by RME, especially at elevated temperature and in the presence of oxygen. Its effect to is to accelerate the embrittlement of the material, thereby impairing its long-term service properties.

Coating the interior of the hollow articles has been proposed for overcoming this problem. One disadvantage of an interior coating, is however, is that it is somehow complex to implement industrially and so always gives rise to considerable additional manufacturing costs. Moreover, in the PFT sector there is increasing use of co-extruded 6-layer tanks with a central barrier layer, whose additional internal fluorination would weight heavily on the manufacturing costs of such PFTs.

One possible solution of the stabilization of ethylene homo- or copolymers against vegetable oil esters was already described in EP 1 042 399. This prior art reference describes the employment of sterically hindered amines or N-hydroxy- or N-oxylderivatives thereof and their influence to maintain the intrinsic viscosity (=Staudinger Index) of the polymer after a long time storage at elevated temperatures in close contact with RME. However, actual investigations did show that the more important resistance of the polymer against thermooxidative degradation, expressed by a high OIT-value (=Oxidative induction time) is still unsatisfactory with the known stabilization system.

It is the object of the present invention to provide ethylene homo- or copolymer compositions, for producing articles of plastic and components for the storage and transport of liquid fuels comprising biodiesel, especially vegetable oil esters, which are further stabilized and exhibit improved resistance against thermooxidative degradation in the presence of biodiesel and oxygen in combination with that.

We have found surprisingly that this object is achieved according to the instant invention by ethylene homo- and copolymers stabilized by a combination of at least two sterically hindered amine compounds or N-hydroxy- or N-oxyl-derivatives thereof in an amount ranging from 100 to 10 000 ppm, calculated on total weight of the stabilized polymer.

The total amount of stabilizer present in the polymer is defined as the sum of each single amount of each single stabilizer, whereby the ratio of the single amounts of the single stabilizers to each other ranges from 1:0.2 to 1:5, preferably from 1:0.5 to 1:2, based on weight-%.

Another solution of the problem is the preparation of articles of plastic and components for the storage and for the transport of liquid fuels comprising biodiesel, especially vegetable oil esters, especially plastic fuel containers, from such ethylene homo- or copolymer compositions.

Another solution of the problem is the use of a combination of at least two sterically hindered amine compounds to maintain a high OIT-value in ethylene homo- or copolymer compositions.

Especially, the ethylene homo- or copolymer composition of the instant invention comprises a combination of Chimassorb® 944 and Tinuvin® 770 as sterically hindered amine compounds.

The stabilizer Chimassorb 944 is thereby understood to have the following chemical formula:

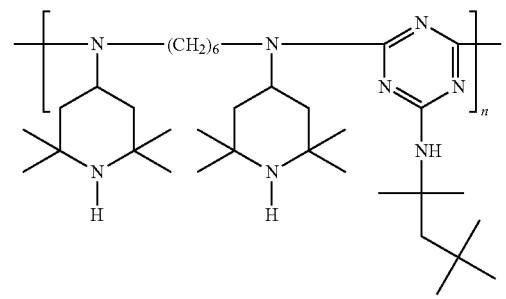

addressed as: poly[[6-(1,1,3,3-tetramethylbutyl)amino]1,3,5-triazin-2,4-diyl][2,2,6,6-tetramethyl-4-piperidinyl)imino]-1,6-hexandiyl[(2,2,6,6-tetramethyl-4-piperidinyl)imino]], whereby n is an integer ranging from 2 to 20.

The stabilizer Tinuvin 770 has the following chemical composition:

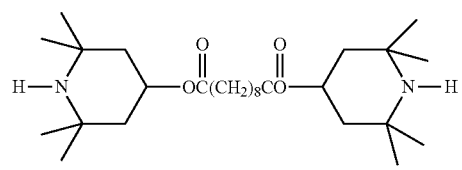

addressed as: Bis-(2,2,6,6-tetramethyl-4-piperidinyl)-sebacate.

We have also found articles of plastic and components for the transport and storage of liquid fuels comprising biodiesel, such as vegetable oil esters, produced using such stabilized polymers, and ethylene homo- or copolymer compositions stabilized by adding the combination of the two sterically hindered amines Chimasorb 944 and Tinuvin 770 in a preferred amount of from 200 to 5000 ppm, more preferred from 400 to 3000 ppm, calculated on total weight of the stabilized polymer.

Suitable stabilizers for the ethylene homo- and copolymers are preferably the two sterically hindered amines themselves. However, their N-hydroxy- or N-oxylderivatives may also be useful and other stabilizers may be added in addition thereto, such as sterically hindered amines including other secondary amines whose substitution on the carbons adjacent to the amine nitrogen is such that no single hydrogen remains at these positions. Preference is given to derivatives of 2,2,6,6-tetramethylpiperidine, substituted either at the 4-position or on the amine nitrogen, and to derivatives of quinoline and of diphenylamine.

Some preferred amine compounds in the aforementioned sense are:
2,2,6,6-tetramethylpiperidine,
2,2,6,6-tetramethylpiperidine-4-ol,
2,2,6,6-tetramethylpiperidine-4-one,
2,2,6,6-tetramethylpiperidine-4-yl acetate,
2,2,6,6-tetramethylpiperidine-4-yl 2-ethylhexanoate,
2,2,6,6-tetramethylpiperidine-4-yl stearate,
2,2,6,6-tetramethylpiperidine-4-yl benzoate,
2,2,6,6-tetramethylpiperidine-4-yl 4-tert-butylbenzoate,
Bis(2,2,6,6-tetramethylpiperidine-4-yl) succinate,
Bis(2,2,6,6-tetramethylpiperidine-4-yl) adipate,
Bis(2,2,6,6-tetramethylpiperidine-4-yl) n-butylmalonate,
Bis(2,2,6,6-tetramethylpiperidine-4-yl) phthalate,
Bis(2,2,6,6-tetramethylpiperidine-4-yl) isophthalate,
Bis(2,2,6,6-tetramethylpiperidine-4-yl) terephthalate,
Bis(2,2,6,6-tetramethylpiperidine-4-yl) hexahydroterephthalate,
N,N'-bis(2,2,6,6-tetramethylpiperidine-4-yl)adipinamide,
N-(2,2,6,6-tetramethylpiperidine-4-yl)caprolactam,
N-(2,2,6,6-tetramethylpiperidine-4-yl)dodecylsuccinimide,
2,4,6-tris-[N-butyl-N-(2,2,6,6-tetramethylpiperidine-4-yl)]-s-triazine,
4,4'-ethylenebis(2,2,6,6-tetramethylpiperazine-3-one) and tris(2,2,6,6-tetramethyl-1-oxylpiperidine-4-yl) phosphite and the N-hydroxy and N-oxyl derivatives thereof, as well.

The ethylene homo- or copolymer compositions used in accordance with the invention comprise the combination of sterically hindered amines or it comprises their N-hydroxy or N-oxyl derivatives.

The term ethylene homo- or copolymer composition is understood to address a polymer comprising ethylene as a main component which has been prepared by polymerization under low pressure conditions in the presence of a suitable polymerization catalyst. Common catalysts for the polymerization of olefins are titanium based Ziegler catalysts or chromium based Philips catalysts. These catalysts are used world wide for the manufacture of polymers in world scale production plants. Other suitable catalysts are zirconium based metallocene catalysts which have been developed within the last twenty years and which are now described in many publications world wide.

As co-monomers for the ethylene, other homologue olefins are suitable comprising from 3 to 10 carbon atoms, such as 1-propene, 1-butene, 1-pentene, 1-hexene, 1-heptene, 1-octene and 1-decene. The co-monomers may be present during the polymerization of the ethylene in an amount of from 1 to 8% by weight, preferably from 2 to 7% by weight, calculated on total weight of the monomers present in the reaction mix.

The polymerization takes place in a polymerization reactor, whereby different techniques are possible such as slurry polymerization in stirred vessels or in loop reactors or gas phase polymerization in stirred bed or fluidized bed reactors.

For use in the field of extrusion and blow molding, the polyethylene preferably has a melt flow rate MFR (190/21.6) of from 1 to 25 g/10 min, in particular from 2 to 20 g/10 min, and for use in the field of injection molding, an MFR (190/2.16) of from 0.1 to 100 g/10 min is preferred, in particular from 0.2 to 10 g/10 min.

Particularly suitable for use in accordance with the invention are ethylene homo- and copolymers having a density of from 0.930 to 0.970, in particular from 0.940 to 0.960 g/cm$^3$, and, with particular advantage, the polymer employed is HDPE as normally used, for example, to produce PFTs.

The polyethylene normally includes additional substances for thermal and in-process stabilization. These substances, which may also be used in combination with the RME resistance stabilizers used in accordance with the invention, include sterically hindered phenols, which may also contain nitrogen and/or sulfur as heteroelements, lactones, which may also contain nitrogen and/or sulfur as heteroelements, organic esters of phosphorous acid (e.g. trialkyl phosphites), which may also contain nitrogen and/or sulfur as heteroelements, and alkali metal and alkaline earth metal stearates. Examples of stabilizers from the class of sterically hindered phenols are benzenepropanoic acid 3,5-bis(1,1-dimethylethyl)-4-hydroxy-2,2-bis[[3-[3,5-bis(1,1-dimethylethyl)-4-hydroxyphenyl]-1-oxopropoxy]methyl]-1,3-propanediyl ester (Irganox®1010 from Ciba Additives GmbH), benzenepropanoic acid 3,5-bis(1,1-dimethylethyl)-4-hydroxy-octadecyl ester (Irganox®1076 from Ciba Additives GmbH), 4-[[4,6-bis(octylthio)-1,3,5-triazin-2-yl]amino]-2,6-bis(1,1-dimethylethyl)phenol (Irganox®565 from Ciba Additives GmbH), and N,N'-hexamethylenebis(3,5-di-tert.butyl-4-hydroxyhydrocinnam-amide) (Irganox®1098 from Ciba Additives GmbH). Examples of stabilizers from the class of the lactones are benzofuran-2-ones, such as 5,7-di-t-butyl-3-(3,4-dimethylphenyl)-3H-benzofuran-2-one. Examples of stabilizers from the class of the organic phosphites are 2,4-bis(1,1-dimethylethyl)phenol phosphite (Irganox®168 from Ciba Additives GmbH) and phosphorous acid [1,1'-biphenyl]-4,4'-diylbis-, -tetrakis[2,4-bis(1,1-dimethylethyl)phenyl]ester.

The incorporation of the stabilizers into the polymers can take place, for example, during the production of a granular base material or not until during the melting operation in preparation for shaping, which can take place, for example, by extrusion, injection molding or blow molding.

The ethylene homo- or copolymer compositions used in accordance with the instant invention are outstandingly suited to the production of articles of plastic and components for the transport and storage of liquid fuels comprising biodiesel, such as vegetable oil esters, especially vegetable oil methyl esters. By articles of plastic and components in this context are meant all the plastics parts which are exposed to the liquid fuels for a prolonged period, especially plastic fuel tanks, but also parts such as pipes and feedlines, bottles, canisters, drums, etc. Articles of plastic and components as described before may also complies multilayered materials prepared par example according to the co-extrusion technique, wherein at least one layer is present comprising the ethylene homo- or copolymer of the instant invention.

EXAMPLES

(I) Measurement Methods

DSC-OIT expressed as [min]: Oxydative Induction Time according to ASTM D 3895 and DIN EN 728 (at 200° C.);
I.V. expressed as [dl/g]=Intrinsic viscosity according to ISO1628 (at 130° C., 0.001 g/ml Decalin);
Density expressed as [g/cm$^3$] ISO 1183
HLMFR expressed as [g/10 min] (High Load Melt Flow Rate, measured at 190° C. and a load of 21.6 kg according to ISO 1133
Chimassorb® 944 was purchased from Ciba Inc. and Tinuvin® 770 DF from Ciba Inc. as well.
Irganox® 1010 and Irgafos® 168 were purchased from Ciba Inc.

(II) Experimental Part

High molecular mass polyethylene produced in a gas phase process in the presence of a chromium based Phillips catalyst having a HLMFR (190° C./21.6 kg) of 6 g/10 min and a density of 0.946 g/cm$^3$ was treated with stabilizers as indicated in table 1.

All polymers, except that of example 1, were additionally stabilized with 400 ppm Irganox 1010 and 1100 ppm Irgafos 168.

TABLE 1

Table 1: Properties of pelletized samples (*not stabilized)

| | Stabilizer 1 | Amount [ppm] | Stabilizer 2 | Amount [ppm] | I.V. [dl/g] | OIT [min] |
|---|---|---|---|---|---|---|
| Example 1* | none | 0 | none | 0 | 3.1 | 2.5 |
| Example 2 | none | 0 | none | 0 | 3.08 | 25 |
| Example 3 | Chimassorb 944 | 1800 | none | 0 | 2.97 | 13 |
| Example 4 | Chimassorb 944 | 900 | Tinuvin 770 DF | 900 | 3.05 | >100 |

The powder was pelletized and stabilized in an ZSK53 extruder (Krupp Werner & Pfleiderer/Coperion, 1970) equipped with a dosing system for additivation.
Machine Parameters:

TABLE 2

W&P ZSK53

| | |
|---|---|
| Screw diameter D [mm] | 2 × 53 |
| Screw length L [mm] | 1908 (36 × D) |
| Driving output [Kw] | 37 |
| Screw speed [Rotation/Minute] | 0-300 |
| max. Temperature [° C.] | 300 |
| Throughput [kg/h] | 100 |

Examples 5 to 7

Immersion Test with Biodiesel B100 (=RME)

The pelletized samples from examples 2, 3 and 4 were used to prepare bottles having a volume of 310 ml via blow molding. A blow molding machine from Fischer W. Müller BFB-1-4 (1999) was used. The bottles were prepared at a temperature of 200° C. and with a throughput of 7 kg/h.

155 ml B100 was added to each bottle and the open bottles were stored in a drying chamber at 80° C. The fuel B100 was removed from the bottles after 500 h and samples were cut from each bottle outside below the filling line. The intrinsic viscosity as well as OIT were measured.

The results are indicated in the following table 3.

| | I.V. bottle [dl/g] | OIT bottle [min] | I.V. after 500 h [dl/g] | OIT after 500 h [min] |
|---|---|---|---|---|
| Example 5 (2) | 3.08 | 25 | 2.04 | 0.8 |
| Example 6 (3) | 2.97 | 43 | 3.01 | 37 |
| Example 7 (4) | 3.05 | 100 | 3.06 | 100 |

The invention claimed is:

1. An ethylene homo- or copolymer composition comprising:
    (i) at least two sterically hindered amine compounds in an amount of from 100 to 10,000 ppm, calculated on total weight of the stabilized polymer composition;
    (ii) a stabilizer selected from the group consisting of:
        tetrakis-(methylene-(3,5-di-tert-butyl-4-hydrocinnamate))methane,
        octadecyl-3-(3,5-di-tert-butyl-4-hydroxyphenyl)-propionate,
        4-((4,6-bis(octylthio)-1,3,5-triazin-2-yl)amino)-2,6-di-tert-butylphenol,
        N,N'-hexane-1,6-diylbis(3-(3,5-di-tert-butyl-4-hydroxyphenylpropionamide)), and
        5,7-di-t-butyl-3-(3,4-dimethylphenyl)-3H-benzofuran-2-one; and
    (iii) an organic phosphite selected from the group consisting of:
        2,4-bis(1,1-dimethylethyl)phenol phosphite and
        phosphorous acid, P,P'-[1,1'-biphenyl]-4,4'-diyl P,P,P',P'-tetrakis(2,4-bis(1,1-dimethylethyl)phenyl]ester).

2. The ethylene homo- or copolymer composition according to claim 1, wherein the amount of the at least two sterically hindered amine compounds ranges from 200 to 5000 ppm, calculated on total weight of the stabilized polymer.

3. The ethylene homo- or copolymer composition according to claim 2, where in the amount of the at least two sterically hindered amine compounds ranges from 400 to 3000 ppm, calculated on total weight of the stabilized polymer.

4. The ethylene homo- or copolymer composition according to claim 1, wherein at least one of the sterically hindered amine compounds has the chemical formula:

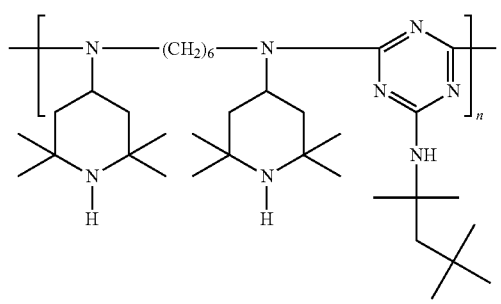

wherein n is an integer ranging from 2 to 20.

5. The ethylene homo- or copolymer composition according to claim 1, wherein at least one of the sterically hindered amine compounds has the chemical formula:

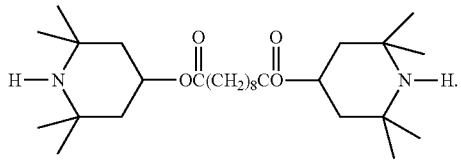

6. The ethylene homo- or copolymer composition according to claim 1, where in the polymer further comprises stabilizers selected from sterically hindered secondary amines whose substitution on the carbons adjacent to the amine nitrogen is such that any single hydrogen does not remain at these positions.

7. The ethylene homo- or copolymer composition according to claim 1, the polymer having a melt flow rate MFR (190/21.6) of from 1 to 25 g/10 min, wherein the composition is an extrusion molding composition.

8. The ethylene homo- or copolymer composition according to claim 1, wherein the polymer has a density of from 0.930 to 0.970 g/cm³.

9. A process comprising producing articles of plastics and components for the transport and storage of vegetable oil esters with an ethylene homo- or copolymer composition according to claim 1.

10. A process comprising forming a polymer composition comprising:
    (i) an ethylene homo- or copolymer composition
    (ii) at least two sterically hindered amine compounds,
    (iii) a stabilizer selected from the group consisting of:
        tetrakis-(methylene-(3,5-di-tert-butyl-4-hydrocinnamate))methane,
        octadecyl-3-(3,5-di-tert-butyl-4-hydroxyphenyl)-propionate,
        4-((4,6-bis(octylthio)-1,3,5-triazin-2-yl)amino)-2,6-di-tert-butylphenol,
        N,N'-hexane-1,6-diylbis(3-(3,5-di-tert-butyl-4-hydroxyphenylpropionamide)), and
        5,7-di-t-butyl-3-(3,4-dimethylphenyl)-3H-benzofuran-2-one; and
    (iv) an organic phosphite selected from the group consisting of:
        2,4-bis(1,1-dimethylethyl)phenol phosphite and
        phosphorous acid, P,P'-[1,1'-biphenyl]-4,4'-diyl P,P,P', P'-tetrakis(2,4-bis(1,1-dimethylethyl)phenyl]ester)
    wherein the polymer composition has an OIT-value of at least 80 min after treatment of the polymer composition at a temperature of 80° C. over a time period of 500 hours in the presence of liquid fuels comprising biodiesel and oxygen, wherein at least one of the sterically hindered amine compounds has the chemical formula:

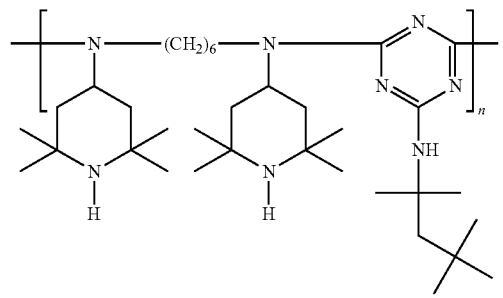

wherein n represents an integer in the range of from 2 to 20 and at least one of the sterically hindered amine compounds has the chemical formula:

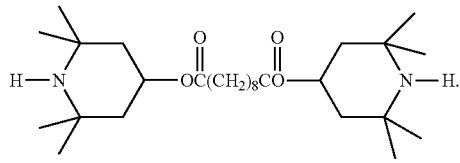

11. Articles of plastic and components for the transport and storage of liquid fuels comprising biodiesel produced by using the ethylene homo- or copolymer compositions according to claim 1.

12. The ethylene homo- or copolymer composition according to claim 1 wherein the biodiesel is a vegetable oil ester.

13. The ethylene homo- or copolymer composition according to claim 7 wherein the MFR (190/21.6) is from 2 to 20 g/10 min.

14. The ethylene homo- or copolymer composition according to claim 1, the composition having a melt flow rate MFR (190/21.6) of from 0.1 to 100 g/10 min, wherein the composition is an injection molding composition.

15. The ethylene homo- or copolymer composition according to claim 14 wherein the MFR (190/21.6) is from 0.2 to 10 g/10 min.

16. The ethylene homo- or copolymer composition according to claim 6 wherein the sterically hindered secondary amines are selected from derivatives of 2,2,6,6-tetramethylpiperidine, substituted either at the 4-position or on the amine nitrogen, or derivatives of quinoline and of diphenylamine.

17. The ethylene homo- or copolymer composition according to claim 8, wherein the polymer has a density from 0.940 to 0.960 g/cm³.

18. The process of claim 9 wherein the articles of plastics and components are plastic fuel tanks for automotive vehicles, comprising single layered or multilayered articles.

19. The articles of claim 11 wherein the biodiesel is a vegetable oil ester.

20. The ethylene homo- or copolymer composition according to claim 12, wherein the polymer has an OIT-value after treatment at a temperature of 80° C. over a time period of 500 h of at least 80 min.

* * * * *